United States Patent [19]

Dickstein et al.

[11] 4,397,751
[45] Aug. 9, 1983

[54] MAGNETIC DISK COATINGS

[75] Inventors: Heidi L. Dickstein; William H. Dickstein, both of Campbell, Calif.

[73] Assignee: International Business Machines Corporation, Armonk, N.Y.

[21] Appl. No.: 260,440

[22] Filed: May 4, 1981

[51] Int. Cl.³ .............................................. G11B 5/78
[52] U.S. Cl. ................................ 252/62.54; 360/134; 360/135; 360/136; 427/128; 428/694; 428/695; 428/900
[58] Field of Search ................ 427/128; 428/692, 694, 428/695, 900; 360/134, 135, 136; 252/62.54; 260/42.14; 106/308 R, 308 B, 308 M, 308 Q

[56] References Cited

U.S. PATENT DOCUMENTS

| | | | |
|---|---|---|---|
| Re. 28,866 | 6/1976 | Haefele et al. | 428/336 |
| 3,058,844 | 10/1962 | Johnson et al. | 117/132 |
| 3,485,758 | 12/1969 | Borucki et al. | 252/62.54 |
| 4,076,890 | 2/1978 | Yamada et al. | 428/337 |
| 4,082,681 | 4/1978 | Takayama et al. | 252/62.54 |
| 4,165,232 | 8/1979 | Joeckh et al. | 75/0.5 AA |
| 4,261,913 | 4/1981 | Mont et al. | 106/308 Q |
| 4,330,600 | 5/1982 | Kawasumi et al. | 428/694 |

Primary Examiner—Ellis P. Robinson
Attorney, Agent, or Firm—Walter J. Madden, Jr.

[57] ABSTRACT

A magnetic disk coating composition contains magnetic particles and a binder system comprising epoxy and phenolic resins, a titanate coupling agent and a water miscible solvent system, the coating having a pigment volume concentration of up to 35.

6 Claims, 4 Drawing Figures

MAGNETIC DISK COATINGS

TECHNICAL FIELD

This invention relates generally to a magnetic recording coating, and more particularly to a magnetic layer on which data is stored in the form of spatially discrete areas, the magnetization of which can be controlled and sensed individually.

BACKGROUND ART

The present invention is directed to magnetic record members used for the storage of data information. This information is translated into a code, the elements of which are the direction of the magnetization of discrete areas of a magnetic medium. The information is retrieved by readout devices such as magnetic heads, which sense the direction of the magnetization retained in any of these discrete areas. The magnetic record members involved may be those such as tape, disk, drum or other forms which support the magnetic recording medium.

In order to store large quantities of information, the areas storing each element of information must be small. The distinction of the magnetization of one small area of the magnetic medium from that of contiguous areas generally requires that the magnetic sensing device be placed close to the desired element. This necessitates a precisely defined surface geometry. A high retrieval rate demands a high relative velocity between the medium and the read/write head, and this in turn requires precise surface geometry. The greater the quantity of magnetic information that can be readily stored for distinctive output, and the greater the area useful for the storage of the magnetic information, the better the economy and usefulness of the magnetic recording medium. To store the maximum quantity of magnetic information, the magnetic properties of the recording medium must have critical magnetic and geometric characteristics. These properties must be retained while subject to friction in atmospheres which may contain constituents which corrode metals.

Some currently used magnetic disk coatings contain small alumina particles in the coating for the purpose of attaining sufficient durability. However, the alumina lends nonhomogeneity to the coating and results in magnetic defects. Furthermore, some current coatings have intrinsic, binder-related nonuniformities. The new magnetic disk coatings described herein do not contain alumina, and have been developed to minimize all binder-related nonuniformities. A goal of the present invention is to achieve a particulate magnetic coating with sufficient durability, and with significantly decreased magnetic defects as compared to current disks.

THE INVENTION

Basically, the coating system of this invention comprises magnetic particles and a binder system including copolymers of epoxy and phenolic resins, a titanate coupling agent, and a selected water miscible solvent system in which all components are mutually soluble. The primary binder resins employed in these coatings are epoxy and phenolic resins. The use of such epoxy/phenolic systems offer wide flexibility in the manipulation of the mechanical properties of the coatings. These nonalumina formulations must rely on the binder, rather than the alumina filler, to achieve durability. Bisphenol A type epoxy resins of molecular weights ranging from 900 to 4500 have been used. Such resins result in harder, more chemically and heat resistant coatings with a much broader range of application parameters than possible with prior coatings.

Coupling agents are chemicals designed for the purpose of chemically bonding the iron oxide particles to the resin system of the coatings. In addition, these bifunctional molecules also aid in the dispersion of the iron oxide in the resin system as well as catalyze the reaction. Titanate coupling agents are preferred for the present invention.

These new coatings employ a new water miscible solvent system. These solvents, preferably glycol ethyl ether, hydroxyethylacetate, and diethyleneglycolbutylether, offer some distinct advantages over currently used solvents. The new solvents have a high degree of water solubility, thus making them more compatible with iron oxide particles which intrinsically absorb water at their surfaces. Unlike some current solvent systems, the new solvents are compatible with the titanate coupling agents. Furthermore, all of these solvents are capable of dissolving the various resins individually, thus allowing more freedom in the manipulation of solvent ratios.

Coatings similar to those described below have been tested for processability, flyability, stop/start, and magnetic defects. These coatings are fully compatible and processable with currently used processing machines and methods. Disks made with these new coatings have been able to pass glide height requirements as well as other durability requirements. For a variety of reasons, disks made with these coatings show a substantial reduction in missing bits and extra bits when compared to current alumina-containing disks.

PRIOR ART

There is an extensive number of patents and publications showing different compositions for magnetic recording coatings. Representative ones are:

U.S. Pat. No. 3,058,844 discloses a magnetic coating composition containing epoxy and phenolic resins, an acid anhydride catalyst, polyvinyl methyl ether, and ferromagnetic particles.

U.S. Pat. No. 4,076,890 shows a magnetic coating composition employing resins, ferromagnetic particles, and a silane coupling agent.

U.S. Pat. No. Re. 28,866 discloses an epoxy/phenolic based magnetic coating having alumina particles dispersed therein to increase the coating durability.

None of these references, nor any others of which the inventors are aware, disclose the unique combination of constituents possessed by the coatings described herein.

BEST MODE EMBODIMENT AND INDUSTRIAL APPLICABILITY

Figure 1:
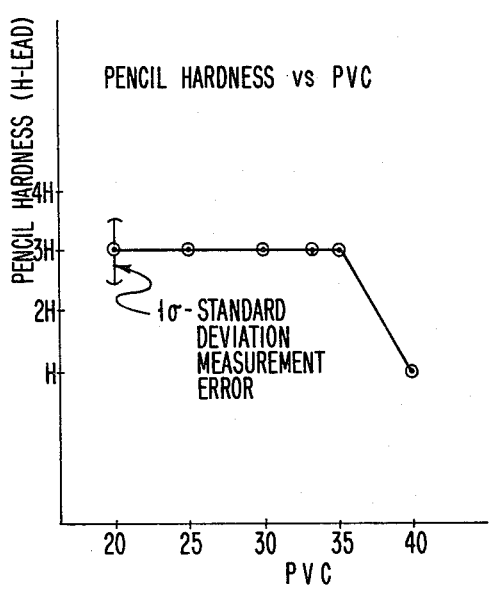
FIGS. 1-4 are graphs illustrating variations in four parameters of coating properties as a function of pigment volume concentration (PVC).

In general, the coatings are formulated by placing the constituents in a mill and milling them for a specified length of time. The milled ingredients are then thinned to the proper viscosity for spin coating and spin coated onto a rotating disk substrate. After coating, the magnetic particles may be magnetically aligned by application of a magnetic field to the still liquid coating, as is well known in the art. After spin coating on the substrate, the excess coating is spun off and the coating is cured for a predetermined length of time at a selected temperature to form a hard, durable coating. The cured coating may be buffed to bring the resulting coating to a desired thickness. A lubricant may then be applied to the buffed coating to lubricate the coating relative to one or more transducers which are to be in contact with the coating during some portion of the disk operation.

One of the key features of the present invention is the ability to achieve high values of pigment volume concentration in a magnetic coating. Another important feature is the realization of the criticality of the pigment volume concentration of the magnetic particles in the coating. PVC can be defined as the ratio of the volume of magnetic pigment particles in the coating to the combined volumes of the magnetic pigment and the binder system, usually expressed as a percentage. It has been found that variations in the PVC affect the following properties of the resulting coating.

(1) direct impact resistance, (2) pencil test hardness, which is a measure of the ability of a pencil point to penetrate the coating, (3) Taber weight loss, which is an abrasion test in which weight loss after a predetermined number of abrasion cycles is measured, (4) gloss of the coating surface, (5) adhesion under an Arco microknife test, and (6) hardness under an Arco microknife test.

On the one hand, high values of PVC are desirable to increase the amount of magnetic material in the coating to thereby increase the magnetic signal strength available. This is particularly important for improved ability to read signals even when the magnetic head is not exactly centered over the data track. This so-called "off track" performance is an important measure of the characteristics of present day disk files.

On the other hand, should the PVC exceed a certain critical level, there is insufficient binder available to wet all of the magnetic particles, leading to the undesirable introduction of air into the cured coating.

We have found that there is a transition in the values of each of the above properties within a relatively narrow range of the value of the PVC, and it is this transition range of PVC values has been shown to be critical for the present coating system.

A substantial amount of work has been done to study the effects on the resulting coating of changes in the following variables in the coating process.

1. Milling viscosity.
2. Milling time.
3. Coating mixture viscosity.
4. Application parameters.
5. Coating curing time and temperature.
6. Coating thickness after buffing.

The effects of these changes on the following properties of the resulting disk were measured:

1. Missing magnetic bits in the coating. A common method of testing for this is to record a known bit pattern on a disk surface and then read it back to determine if any of the recorded bits do not appear. This test is usually performed at different clip levels for the detected bits, expressed as a percentage. The higher percentage the clip level, the larger the number of missing bits.

2. Extra magnetic bits in the coating. This can be measured by applying to a disk surface an erasing magnetic field which should totally erase any bits on the surface. Any magnetic bits subsequently detected on that surface are considered spurious or extra. Different clip levels for detected bits are also used in this test, with the number of extra bits increasing as the clip level is lowered.

3. Coating durability.

4. Orientation ratio—this is the ratio of the number of magnetic particles in the coating which are magnetically aligned to the number which are not so aligned.

5. Magnetic squareness.

6. Magnetic Coercivity.

One representative coating mixture in accordance with the present invention was prepared using the following ingredients in the amounts indicated.

| | | Parts (weight/weight) |
|---|---|---|
| 1. | $Fe_2O_3$ particles-M02228, manufactured by Pfizer | 95 |
| 2. | Epoxy Resin-DER667, manufactured by Dow Chemical | 23.8 |
| 3. | Phenolic Resin-P-97, manufactured by Monsanto under the trade mark Resinox | 47.6 |
| 4. | Titanate Coupling Agent-KR-38S, an Isopropyl Tri (Dioctylpyrophosphato) Titanate, manufactured by Kenrich Petroleum Corp. under the trade mark Kenreact | 1.4 |
| 5. | Solvents | |
| | (a) Gycol ethyl ether, manufactured under the trade mark Cellosolve by Union Carbide | 60.8 |
| | (b) Hydroxyethylacetate, manufactured under the trade mark Cellosolve Acetate by Union Carbide | 60.8 |
| | (c) Diethyleneglycolbutylether, manufactured under the trade mark Butyl Carbitol by Union Carbide | 52.1 |
| 6. | Flow additives | |
| | (a) XU226, sold by Ciba-Geigy under the trade mark Araldite | 5 |
| | (b) PA-57, manufactured by Dow Chemical | .05 |
| | (c) S-107 manufactured by Ciba-Geigy | 0.1 |

The optimum milling viscosity for the above mixture was found to be approximately 70 Kreb units, with a base grind milling time of 71 hours, followed by two hours of milling after the addition of more solvent to reduce the dispersion viscosity to a value suitable for coating.

This coating, milled at 42.5 percent solids, had a mill base grind rating of better than 7 plus as measured on a Hegman fineness-of-grind gauge after 71 hours of milling. The final coating dispersion was excellent, with a grind rating of 4. The coatability at 44.5 centipoise was excellent. Microscopically, the cured disk presented an exceptionally uniform and void-free continuous film.

The graph of FIG. 1 indicates the transition in coating quality as a function of PVC, as discussed above. FIG. 1 is a plot of the hardness of the cured coating as measured by a pencil hardness test in which a pencil point is pressed against the coating and the extent of coating deformation is measured. From this graph, it can be seen that there is an abrupt change in coating quality above a PVC value of 35.

Figure 2:
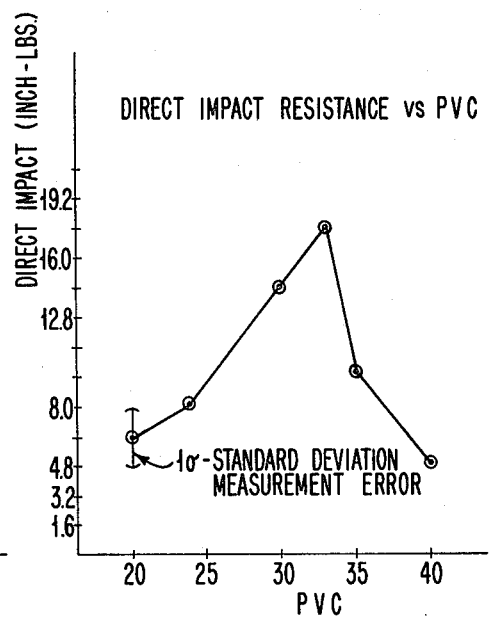

FIG. 2 is a graph illustrating the adhesion properties of the cured coating as measured by a microknife adhesion test as a function of the coating PVC. It can be seen that there is a definite transition in these adhesion properties above a PVC value of approximately 35, and that the adhesion properties are best in the 30-35 range for PVC.

Figure 3:
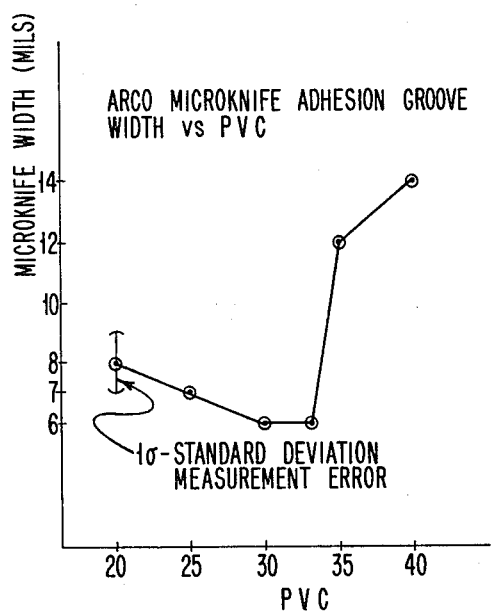
Figure 4:
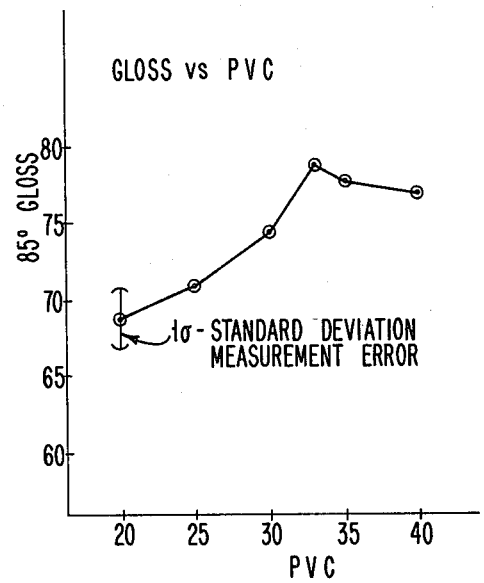

FIG. 3 is a graph showing variations in the measured gloss of the cured coating as a function of PVC. It is apparent from FIG. 4 that the gloss is best in the region of 30 PVC and that a transition occurs in the 30-35 PVC range.

The other tests listed above, but now shown in graph form here, showed comparable transition regions in the 30-35 PVC range.

The various spin coat parameters employed for three groups of disks coated with the above formulation are listed in Table I.

TABLE I

SPIN COAT PARAMETERS

| Group | Coat rpm | Delay | Spin-Off rpm | Spin-Off Time | Spin Dry rpm |
|---|---|---|---|---|---|
| 1 | 525 | 1 sec | 3500 | 6 sec | 1500 |
| 2 | 525 | 1 sec | 3000 | 6 sec | 1500 |
| 3 | 525 | 1 sec | 4000 | 6 sec | 1500 |

The surfaces were then buffed and washed and a lubricant applied thereto.

Average missing bit defects ranged from 1000 to 1500 per surface at 80% clip level, and 320 to 500 per surface range at 75% clip level.

Table II below lists the results of tests for orientation ratio, magnetic squareness and coercivity on both surfaces of a disk coated with the formulation given above. Tests were conducted at both the inside and outside diameters of each surface, and each test was repeated at least once at each location on both surfaces.

TABLE II

| Surface | Orientation Ratio | Squareness | Coercivity |
|---|---|---|---|
| 1 ID | 2.52 | 0.87 | 354 Oe |
| 1 ID | 2.48 | 0.85 | 355 Oe |
| 1 OD | 2.50 | 0.85 | 350 Oe |
| 1 OD | 2.47 | 0.86 | 361 Oe |
| 1 OD | 2.43 | 0.88 | 349 Oe |
| 2 ID | 2.45 | 0.84 | 356 Oe |
| 2 ID | 2.52 | 0.84 | 373 Oe |
| 2 ID | 2.49 | 0.85 | 341 Oe |
| 2 OD | 2.41 | 0.86 | 364 Oe |
| 2 OD | 2.31 | 0.92 | 346 Oe |
| 2 OD | 2.71 | 0.86 | 376 Oe |

Table III lists the results of missing bit and extra bit testing of disks made with the coating given above as compared with identical tests on a number of commercially available disks.

TABLE III

| Disk and Surface | Missing Bits Clip Level | | | | |
|---|---|---|---|---|---|
| | 80% | 75% | 70% | 65% | 60% |
| Present Invention Disks | | | | | |
| 1 B | 680 | 200 | 90 | 40 | 40 |
| 2 B | 1510 | 400 | 200 | 140 | 90 |
| 3 A | 680 | 240 | 110 | 40 | 20 |
| 4 A | 820 | 260 | 150 | 50 | 30 |
| 5 A | 900 | 310 | 170 | 140 | 70 |
| 6 A | 830 | 190 | 80 | 60 | 20 |
| Commercially Available Disks | | | | | |
| 1 A | 59330 | 8240 | 1410 | 430 | 220 |
| 1 B | 50930 | 6890 | 1480 | 440 | 220 |
| 2 A | 72100 | 9980 | 1920 | 440 | 200 |
| 2 B | 46860 | 6360 | 1070 | 320 | 90 |
| 3 A | 64970 | 8840 | 1900 | 600 | 330 |
| 4 B | 46570 | 6310 | 1050 | 320 | 80 |
| 5 A | 62770 | 8590 | 1690 | 420 | 110 |

| Disk and Surface | Extra Bits Clip Level | | | | |
|---|---|---|---|---|---|
| | 17% | 19% | 21% | 23% | 25% |
| Present Invention Disks | | | | | |
| 1 B | 1110 | 590 | 160 | 40 | 40 |
| 2 B | 1220 | 540 | 200 | 20 | 20 |
| 3 A | 790 | 610 | 340 | 210 | 90 |
| 4 A | 100 | 60 | 40 | 20 | 20 |
| 5 A | 360 | 200 | 80 | 40 | 0 |
| 6 A | 530 | 310 | 100 | 20 | 0 |
| Commercially Available Disks | | | | | |
| 1 A | 30920 | 5800 | 930 | 180 | 50 |
| 1 B | 28230 | 5980 | 950 | 220 | 120 |
| 2 A | 28230 | 5320 | 1040 | 190 | 50 |
| 2 B | 25830 | 5950 | 1100 | 160 | 30 |
| 3 A | 32230 | 6840 | 1370 | 390 | 190 |
| 4 B | 37590 | 8000 | 1670 | 320 | 80 |
| 5 A | 32620 | 6870 | 1120 | 250 | 50 |

The superiority of the present coating is clearly indicated by the above table for both missing and extra bits.

Table IV lists the results of different types of tests on a disk having a coating formulated as described above as compared with the best commercially available disk. The tests were:

1. Old Information—In this test, the magnetic head is progressively moved off the track center until a bit can not be read. For this test, high values represent better performance.

2. Squeeze—In this test, adjacent tracks are written and one track is progressively moved closer and closer to the other until the other track can not be read. Low values in this test show better performance.

3. Alpha ($\alpha$)—This represents a combination of the results of the old information and squeeze tests. Higher numbers indicate improved performance.

TABLE IV

| | Old Information | | Squeeze | | $\alpha$ | |
|---|---|---|---|---|---|---|
| | ID | MD | ID | MD | ID | MD |
| (a) | 198 | 230 | 683 | 638 | 22.5 | 26.5 |
| (b) | 200 | 234 | 711 | 674 | 22.0 | 25.8 |

(a) - Present Invention Disk - Coating Thickness ≈ 22μ"
(b) - Best Commercially Available Disk Another representative coating in accordance with the present invention contained the following ingredients in the indicated proportions.

| | Parts (Weight/weight) |
|---|---|
| 1. $Fe_2O_3$ particles-M02228, manufactured by Pfizer | 95 |
| 2. Epoxy Resin-DER667, manufactured by Dow Chemical | 15.5 |
| 3. An epoxy cresyl novolak, ECN-1235, manufactured by Ciba-Geigy | 15.5 |
| 4. XU226, sold by Ciba-Geigy under the trade mark Araldite | 5 |
| 5. Glycol ethyl ether, manufactured under the trade mark Cellosolve by Union |  |

-continued

| | Parts (Weight/weight) |
|---|---|
| Carbide | 52 |
| 6. Diethyleneglycolbutylether, manufactured under the trade mark Butyl Carbitol by Union Carbide | 45 |
| 7. Titanate Coupling Agent-KR-38S, an Isopropyl Tri (Dioctylpyrophosphato) Titanate, manufactured by Kenrich Petroleum Corp. under the trade mark Kenreact | 1.4 |
| 8. Phenolic Resin-P-97, manufactured by Monsanto under the trade mark Resinox | 31 |
| 9. PA-57, manufactured by Dow Chemical | .05 |
| 10. Hydroxyethylacetate, manufactured under the trade mark Cellosolve Acetate by Union Carbide | 52 |

Coatings made with this formulation and prepared as described above also exhibited excellent physical and magnetic properties.

We claim:

1. A mixture for coating a magnetic recording member to produce a magnetic coating having magnetic particles in a binder system in a pigment volume concentration of up to 35, where pigment volume concentration is defined as the ratio of the volume of said magnetic particles to the sum of the volume of said binder system and the volume of said magnetic particles, comprising
    said binder system including
        a water-miscible solvent system comprising glycol ethyl ether, hydroxyethylacetate and diethyleneglycolbutylether,
        an epoxy resin selected from a group of epoxy resins which are soluble in each component of said water-miscible solvent system,
        a phenolic resin selected from a group of phenolic resins which are soluble in each component of said water-miscible solvent system, and
        a titanate coupling agent for improving the bond of said magnetic particles to said resins and for catalyzing the cross-linking of said resins,
            each of said components of said water-miscible solvent system being compatible with said titanate coupling agent.

2. A mixture in accordance with claim 1, in which said binder system includes at least one flow additive material.

3. A mixture in accordance with claim 1, in which the ingredients are present in said mixture in the following range of proportions:

| Ingredient | Parts (Weight/weight) |
|---|---|
| Epoxy Resin | 20-26 |
| Phenolic Resin | 40-52 |
| Titanate Coupling Agent | 0.5-2.0 |
| Water Miscible Solvents | 150-190 |
| Magnetic Particles | 80-110 |

4. A mixture in accordance with claim 1, in which the ingredients are present in said mixture in the following proportions:

| Ingredient | Parts (Weight/weight) |
|---|---|
| Epoxy Resin | 24 |
| Phenolic Resin | 48 |
| Titanate Coupling Agent | 1.4 |
| Water Miscible Solvents | 174 |
| Magnetic Particles | 95 |

5. A mixture in accordance with claim 3, including at least one flow additive material present in a range from 3 to 7 parts weight/weight.

6. A mixture in accordance with claim 1, including at least one flow additive material present in an amount of 5 parts weight/weight.

* * * * *